United States Patent [19]

Kondo et al.

[11] Patent Number: 5,441,573
[45] Date of Patent: Aug. 15, 1995

[54] METHOD FOR CLEANING A METAL MOLD

[75] Inventors: Hitoshi Kondo, Hamura; Hirokazu Taniguchi, Kodaira; Yuzo Sakai, Hachioji, all of Japan

[73] Assignee: Bridgestone Corporation, Tokyo, Japan

[21] Appl. No.: 328,056

[22] Filed: Oct. 24, 1994

Related U.S. Application Data

[62] Division of Ser. No. 988,843, Dec. 10, 1992, Pat. No. 5,393,816.

[30] Foreign Application Priority Data

Dec. 10, 1991 [JP] Japan ................. 3-349749
Mar. 5, 1992 [JP] Japan ................. 4-083068
Apr. 2, 1992 [JP] Japan ................. 4-108373
Oct. 20, 1992 [JP] Japan ................. 4-281457

[51] Int. Cl.$^6$ ............................. B08B 9/04
[52] U.S. Cl. ..................... 134/8; 134/22.1; 134/22.19; 134/30; 134/42; 524/265; 524/267; 524/247; 524/425; 524/433; 524/448; 524/492; 524/493
[58] Field of Search .............. 134/22.1, 22.19, 30, 134/42, 8; 524/265, 267, 247, 425, 433, 448, 492, 493

[56] References Cited

FOREIGN PATENT DOCUMENTS

| | | |
|---|---|---|
| 0271107 | 6/1988 | European Pat. Off. |
| 107943 | 6/1979 | Japan. |
| 126251 | 10/1979 | Japan. |
| 63144 | 11/1979 | Japan. |
| 53812 | 12/1982 | Japan. |
| 122942 | 5/1983 | Japan. |
| 180600 | 7/1983 | Japan. |
| 44980 | 7/1984 | Japan. |
| 20585 | 9/1986 | Japan. |
| 113518 | 5/1987 | Japan. |
| 238143 | 11/1988 | Japan. |

OTHER PUBLICATIONS

Novikova et al., "Compression Moulds: Lubricants and Methods of Cleaning," *International Polymer Science and Technology*, vol. 15, No. 4, 1988.
Japanese Patent Abstracts, Section Ch, Week 9129, Sep. 4, 1991, JP-A-3-136817.
Japanese Patent Gazette, Section Ch, Week 8705, Mar. 27, 1987, JP-A-61-287946.
Yokoyama et al, "Mould-Cleaning Methods, (3) Mould-Cleaning Rubbers," *International Polymer Science and Technology*, vol. 12, No. 12, 1985.

*Primary Examiner*—Paul R. Michl
*Assistant Examiner*—U. K. Rajguru
*Attorney, Agent, or Firm*—Sughrue, Mion, Zinn, Macpeak & Seas

[57] ABSTRACT

A rubber composition for cleaning a metal mold comprises a rubber, an aminoalcohol, a glycol, an adsorptive, and if desired, an organic silane of the formula, $Z^1\text{-Alk}^1\text{-S}_n\text{-Alk}^2\text{-Z}^2$ where $Z^1$ and $Z^2$ are —$Si(R^1)(R^2)(R^3)$ where $R^1$, $R^2$ and $R^3$ are $C_{1-4}$ alkoxy, $Alk^1$ and $Alk^2$ are $C_1$–$C_6$ hydrocarbylene, n is 2–6, or an organic peroxide having a predetermined half-life due to decomposition.

Metal molds are cleaned by bringing the above-mentioned rubber composition into contact with a surface of a dirtied metal mold and heating.

16 Claims, No Drawings

METHOD FOR CLEANING A METAL MOLD

This is a divisional of application No. 07/988,843 filed Dec. 10, 1992 now U.S. Pat. No. 5,393,816.

BACKGROUND OF THE INVENTION

1. Field of the Invention

The present invention relates to a rubber composition for cleaning metal molds and a method for cleaning metal molds by using the rubber composition, and more particularly, to a rubber composition for cleaning metal molds the surfaces of which are soiled by repeated vulcanization and a method for cleaning the metal molds.

2. Description of the Related Art

In the rubber molding industry, it has been known for a long time that metal molds for vulcanization are soiled. Dirt of metal mold is accelerated in a vulcanization step as the frequency in use increases and adversely affects quality, appearance, precision of size and the like, and further the dirt makes releasability of molded rubber from metal molds poor and shortens the life of metal molds.

Therefore, there have been proposed various counter-measures to prevent dirt of metal molds. For example, Japanese Patent Publication No. 44980/1984 discloses a method comprising adding organic phosphoric acid esters or salts of cyclopentadiene derivative carbonxylic acids to outer surface liquids, and Japanese Patent Application Laid-open No. 113518/1987 discloses a method comprising treating the surface of a metal mold with a compound containing silicon and isocyanate group.

As methods for decreasing dirt of metal mold by incorporating particular substances in rubber compositions to be molded, there have been proposed to incorporate in rubber compositions cyclized polybutadienes (Japanese Patent Application Laid-open No. 63144/1979), organic phosphoric acid esters (Japanese Patent Publication No. 53812/1982), mercaptobenzo-1,3-diazole salts (Japanese Patent Application Laid-open No. 107943/1979), metal salts of cyclopentadiene derivative carboxylic acids (Japanese Patent Application Laid-open No. 126251/1979), 2-mercapto-benzimidazole or zinc salt thereof (Japanese Patent Publication No. 20585/1986), or particular silica (hydrated silicic acid, Japanese Patent Application Laid-open No. 238143/1988).

These methods can not completely prevent the dirt though these can defer the occurrence of dirt. Therefore, periodical cleaning of metal molds such as a shot-blast method, an acid or alkali cleaning and the like are practiced, but these cleaning methods damage the metal molds, accelerate the dirtying speed after the cleaning, and cause corrosion of metal molds, and moreover, it is necessary to remove the metal molds from curing presses, and in case of large scale rubber products, the labors are not negligible and therefore, the productivity is lowered.

As methods for cleaning metal molds without removing the metal molds from a curing press, Japanese Patent Application Laid-open No. 122942/1983 discloses a method where a rubber composition containing an aminoalcohol is used as a cleaning rubber, and Japanese Patent Application Laid-open No. 180600/1983 discloses a method where an aminoalcohol or a solution of an aminoalcohol in ethanol is applied to the dirty surface of a metal mold and then a non-vulcanized rubber composition is vulcanized therein according to a conventional method to clean the mold.

Other than the above-mentioned cleaning methods, various rubber compositions for metal mold cleaning are commercially available and those exhibit cleaning effect to some extent, but the effect is not sufficient. Moreover, most of such cleaning rubber compositions contains a large amount of easily decomposable amine type chemicals so that the compositions have ammoniac smell even at room temperature, and after heating, much more amines are generated and thereby metal molds are corroded or working environmental problems occur.

SUMMARY OF THE INVENTION

An object of the present invention is to provide a rubber composition capable of efficiently and economically cleaning a metal mold.

Another object of the present invention is to provide a rubber composition capable of cleaning a metal mold without, at least partly, deteriorating the metal mold, deteriorating the working environment and removing the metal mold from a curing press.

A further object of the present invention is to provide a rubber composition capable of cleaning even minute portions of a metal mold.

Still another object of the present invention is to provide a method for cleaning a metal mold efficiently and economically.

A still further object of the present invention is to provide a method for cleaning a metal mold by using a particular rubber composition.

According to a first aspect of the present invention is to provide a rubber composition for cleaning a metal mold which comprises 100 parts by weight of a rubber selected from the group consisting of natural rubber, synthetic rubber and a blend thereof, 2–30 parts by weight of an aminoalcohol, 5–50 parts by weight of a glycol and 30–90 parts by weight of an adsorptive, and if desired, additionally 0.1–10 parts by weight of an organic silane of the general formula,

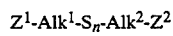

where $Z^1$ and $Z^2$ are independently

in which $R^1$, $R^2$ and $R^3$ are similar or dissimilar and alkoxy group having 1–4 carbon atoms, $Alk^1$ and $Alk^2$ are similar or dissimilar and divalent hydrocarbon radicals having 1–6 carbon atoms and n is a number of 2–6, or 0.5–10 parts by weight of an organic peroxide having a half-life due to decomposition of at least one minute at a heating temperature at which the rubber composition is used.

According to a second aspect of the present invention, there is provided a method for cleaning a metal mold for rubber made dirty by repeating vulcanization of non-vulcanized rubber articles which comprises inserting into the metal mold a cleaning rubber article composed of the non-vulcanized rubber article having on the surface thereof facing the metal mold a layer composed of the rubber composition for cleaning a metal mold of the first aspect as above, heating the cleaning rubber article to adsorb the dirt to the cleaning rubber article, and then taking the cleaning rubber article out of the metal mold resulting in the removal of the dirt from the surface of the metal mold.

DESCRIPTION OF THE PREFERRED EMBODIMENT

According to the first aspect of the present invention, the rubber used in the rubber composition may be natural rubber, synthetic rubbers, alone or as a blend, or a combination of natural rubber and synthetic rubber.

Exemplary suitable synthetic rubbers include synthetic polyisoprene rubber, styrene-butadiene copolymer rubber, polybutadiene rubber, butyl rubber, halogenated butyl rubber, ethylene-propylene terpolymer and the like.

Exemplary suitable aminoalcohols used in the rubber composition of the present invention include:
monoethanolamine,
diethanolamine,
triethanolamine,
N-methylethanolamine,
N,N-dimethylethanolamine,
N,N-dibutylethanolamine,
N,N-diethylethanolamine,
N-methyl-N,N-diethanolamine,
2-amino-2-methylpropanol,
3-aminopropanol,
2-aminopropanol,
and the like.

Monoethanolamine, diethanolamine, 2-amino-2-methyl-propanol, 3-aminopropanol, and 2-aminopropanol are preferable.

These aminoalcohols may be used alone or in combination.

The aminoalcohols may be used in an amount of 2-30 parts by weight, preferably 5-20 parts by weight based on 100 parts by weight of the rubber.

When the amount is less than 2 parts by weight, the effect of metal mold cleaning is not sufficient. On the contrary, when the amount exceeds 30 parts by weight, the break strength is low, and upon taking out the rubber composition after cleaning the mold, the cleaning rubber composition is broken and excess aminoalcohol undesirably remains on the surface of the metal mold.

The glycols used in the present invention may be ethylene glycol, diethylene glycol, triethylene glycol, propylene glycol, dipropylene glycol and the like, preferably diethylene glycol, and dipropylene glycol. The glycols may be used alone or in combination.

The amount of the glycols is 5-50 parts by weight, preferably 10-30 parts by weight based on 100 parts by weight of rubber. When the amount is less than 5 parts by weight, metal molds are not sufficiently cleaned. On the contrary, the amount exceeding 50 parts is not preferable since the cleaning effect does not increase substantially and moreover, the break strength of the rubber composition is lowered, the effect of cleaning metal molds is deteriorated and excess glycols remain on the surfaces of the metal molds.

According to the present invention, an adsorptive is incorporated in the rubber composition so as to peel off the dirty matters from the surface of metal molds.

Exemplary suitable adsorptives include:
silica,
activated alumina,
activated carbon,
magnesium oxide,
titanium oxide,
magnesium carbonate,
calcium carbonate,
bentonite,
diatomaceous earth,
and the like.

Silica capable of reinforcing rubber composition is preferably used since upon taking the rubber composition from the metal mold after cleaning the metal mold having a complicated configuration the rubber composition is broken and remains on the surface of the metal mold.

The amount of the adsorptives is 30-90 parts by weight, preferably 40-70 parts by weight based on 100 parts by weight of rubber.

In case of the adsorptive amount of less than 30 parts by weight, the break strength of the rubber composition is low while in case of the adsorptive amount exceeding 90 parts by weight, the viscosity of the rubber composition becomes so high that upon cleaning the mold, the rubber composition can not flow into small and complicated portions of the metal mold. As a result, there remain undesirably the portions which could not be cleaned.

If desired, an organic silane may be incorporated in the fundamental rubber composition for cleaning a metal mold comprising a rubber, an aminoalcohol, glycol and an adsorptive in respective predetermined amounts as mentioned above.

The organic silane used in the present invention may be represented by the general formula,

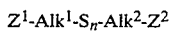

where $Z^1$ and $Z^2$ are independently

in which
$R^1$, $R^2$ and $R^3$ are similar or dissimilar and alkoxy groups having 1-4 carbon atoms, $Alk^1$ and $Alk^2$ are similar or dissimilar and divalent hydrocarbon radicals having 1-6 carbon atoms and n is a number of 2-6.

The hydrocarbon radicals may be divalent straight chain or branched hydrocarbon radicals.

Exemplary suitable organic silanes include
bis(3-triethoxysilylpropyl)-tetrasulfane,
bis(3-trimethoxysilylpropyl)-tetrasulfane,
bis(3-triethoxysilylethyl)-tetrasulfane,
bis(3-trimethoxysilylethyl)-tetrasulfane
bis(3-triethoxysilylpropyl)-trisulfane,
bis(3-trimethoxysilylpropyl)-trisulfane,
bis(3-triethoxysilylethyl)-trisulfane,
bis(3-trimethoxysilylethyl)-trisulfane,
bis(3-triethoxysilylpropyl)-disulfane,
bis(3-trimethoxysilylpropyl)-disulfane,
and
bis(3-triethoxylsilylethyl)-disulfane.

The organic silane, for example, bis(3-triethoxy-silylpropyl)-tetrasulfane ("Si 69", trade name, supplied by Degussa) may be prepared by the method of Japanese Patent Publication No. 28623/1976.

The organic silane can improve the flowability of the cleaning rubber so that even a metal mold of a complicated structure can be filled with the cleaning rubber up to even minute portions. As a result, the cleaning can be effectively carried out.

The amount of the organic silane is 0.1–10 parts by weight, preferably 0.5–5 parts by weight based on 100 parts by weight of rubber. When the amount is less than 0.1 parts by weight, there is not a substantial effect. When the amount exceeds 10 parts, further increase in the amount does not substantially enhance the cleaning effect.

Further, if desired, an organic peroxide may be incorporated in the fundamental rubber composition for cleaning a metal mold as mentioned above.

The organic peroxide used in the present invention is an organic peroxide having a half-life due to decomposition of at least one minute at a heating temperature at which the rubber composition is used.

As mentioned above, a decomposition temperature at which the half-life due to decomposition of the organic peroxide can be one minute is to be higher, preferably at least 5° C. higher, than the heating temperature at which the rubber composition for cleaning a metal mold containing the organic peroxide is used.

Exemplary suitable organic peroxides include:
1,1-bis(t-butylperoxy)-3,3,5-trimethylcyclohexane,
1,1-bis(t-butylperoxy)cyclohexane,
t-butylperoxymaleic acid,
t-butyl peroxyoleate,
t-butyl peroxy-3,3,5-trimethylhexanoate,
cyclohexanone peroxide,
t-butyl peroxyallylcarbonate,
t-butyl peroxyisopropylcarbonate,
2,5-dimethyl-2,5-di(benzoylperoxy)hexane,
2,2-bis (t-butylperoxy)octane,
t-butyl peroxyacetate,
2,2-bis(t-butylperoxy)butane,
t-butyl peroxybenzoate,
n-butyl-4,4-bis(t-butylperoxy)valerate,
di-t-butyl peroxyisophthalate,
methyl ethyl ketone peroxide,
di-cumyl peroxide,
2,5-dimethyl-2,5-di(t-butylperoxy)hexane,
$\alpha,\alpha'$-bis(t-butylperoxy-m-isopropyl)benzene,
t-butylcumylperoxide,
di-isopropylbenzene hydroperoxide,
di-t-butylperoxide,
and
2,5-dimethyl-2,5-di(t-butylperoxy)hexyne-3

The amount of the organic peroxide used is 0.5–10 parts by weight, preferably 1–5 parts by weight, based on 100 parts by weight of the rubber. When the amount is less than 0.5 parts by weight, the cross linking density is so low that the breaking strength of the rubber composition is lowered, and thereby the dirt can not be completely peeled off. On the contrary, when the amount exceeds 10 parts by weight, the flowability of the rubber composition is deteriorated from the initial stage of the cross linking and the rubber composition can not enter to the minute portions of the metal mold upon cleaning. As a result, there remain the portions not cleaned and when the rubber composition is taken out after cleaning the metal mold, the cross linking density is so high that the elongation upon breaking is lowered and as a result, in the case of a metal mold having a complicated shape the rubber composition is broken during taking out the rubber composition and remains in the metal mold.

The fundamental rubber composition, or that containing the organic silane or the organic peroxide may further contain water and/or additives as shown below.

Water may be incorporated in the rubber composition for purposes of enhancing the cleaning effect. Water exhibits an azeotropic effect together with the glycol such as ethylene glycol and thereby, these can be vaporized and penetrate into even minute portions.

The amount of water added is usually 2–10 parts by weight based on 100 parts by weight of rubber.

When the amount is less than 2 parts, there is not observed substantially an effect of adding water. On the contrary, when the amount exceeds 20 parts by weight, the incremental amount does not exhibit an effective improvement, and rather deteriorates the kneading processibility.

In the rubber composition of the present invention, if desired, there may be further compounded into the composition various additives generally used in rubber industry, for example, fillers such as carbon black and the like, softeners such as aroma oil, naphthenic oil and the like, vulcanizers such as sulfur and the like, vulcanization accelerators, antioxidants, and the like.

According to the second aspect of the present invention, the method for cleaning a metal mold for rubber made dirty by repeating vulcanization of non-vulcanized rubber articles comprises inserting into the metal mold a cleaning rubber article composed of the non-vulcanized rubber article having on the surface thereof facing the metal mold a layer composed of the rubber composition for cleaning a metal mold of the first aspect as mentioned above, heating the cleaning rubber article to adsorb the dirt to the cleaning rubber article, and then taking the cleaning rubber article out of the metal mold resulting in the removal of the dirt from the surface of the metal mold.

The layer composed of the rubber composition for cleaning a metal mold of the first aspect may be formed, for example, by attaching or adhering to the surface of a cleaning rubber article facing the metal mold a sheet composed of the composition of the first aspect. The sheet is, for example, about 1–5 mm thick.

In the above, the non-vulcanized rubber article is, for example, a semi-product which can become a product by vulcanization. In case of a tire, it can be a so-called "green tire". However, the non-vulcanized rubber article is not limited to such semi-product, but may be an article similar or equivalent thereto.

Alternatively, the rubber composition of the first aspect may be fully formed into the same shape as the non-vulcanized rubber product and inserted into the soiled metal mold followed by vulcanization, and thereby the cleaning of the soiled metal mold can be carried out.

However, the previously mentioned method, that is, attaching or adhering a sheet composed of the composition of the first aspect to the surface of a non-vulcanized rubber article is preferable since the cleaning cost is inexpensive and excess aminoalcohols and glycols do not remain on the surface of the metal mold after cleaning resulting in prevention of dirtying the metal mold.

As mentioned above, according to the present invention, a soiled metal mold can be efficiently and economically cleaned.

A metal mold made dirty by molding, for example, rubber articles such as tires and the like is usually cleaned by removing the metal mold from a curing press and applying a shot blasting method using glass beads or plastic beads. Therefore, the surface of the metal mold is damaged and further much working is required. However, according to the present invention, such drawbacks can be avoided, that is, the working for cleaning can be reduced to a great extent since the removal of the metal mold from a vulcanizer is not necessary, and the surface of the metal mold is not damaged since shot blasting is not used.

According to the present invention, only a small amount of a rubber cleaning composition is used, and thereby, the cost is low and environmental problems do not occur.

In addition, when an organic silane is incorporated in the cleaning rubber composition, the flowability of the rubber composition is enhanced and the rubber composition can enter the minute portions of a metal mold having a complicated structure.

Further, when an organic peroxide having a particular half-life due to decomposition is compounded into the cleaning rubber composition, the crosslinking speed is retarded by the crosslinking by the peroxide so that the rubber composition can flow into even minute portions of a metal mold. As a result, the cleaning effect is further enhanced.

The present invention is now more particularly described with reference to the following examples which are for the purpose of illustration only and are intended to imply no limitation thereon.

EXAMPLES 1-17, COMPARATIVE EXAMPLES 1-6

Each of the rubber compositions having the formulas as shown in Tables 1, 2, 3, 4 and 5 (infra) was kneaded to form a non-vulcanized rubber sheet of 2 mm thick.

The rubber sheets prepared from six kinds of rubber compositions, that is, Examples 1-5 and Comparative Example 1, were adhered to six equal surface areas of a green tire of 135 SR 12 in tire size (resulting from dividing the whole surface of said tire into six equal areas), respectively.

The other rubber sheets were also adhered to the 5 or 6 equally divided whole surface areas of green tires of the same size.

These green tires were placed in metal molds, respectively, in each of which a green tire of the same size as above had been continuously vulcanized for two weeks resulting in that the surface of the metal mold was made dirty to become black. These green tires were vulcanized for 15 min. and then taken out of the metal mold according to an ordinary procedure.

The degree of metal mold cleaning was evaluated by eye observation. The degree was classified into ten grades, that is, mark 1 to mark 10 where "1" stands for "not cleaned at all" while "10" stands for "cleaned completely". The results are shown in Tables 1-5.

The formula of Prior Art Example (infra) followed that described in "Polymer no tomo" (Polymer Friend), vol. 11, pages 693-695 (1983), that is:

| EPDM | 100 parts by weight |
|---|---|
| Silica | 20 parts by weight |
| 2-Amino-2-methyl-1-propanol | 30 parts by weight |
| Titanium oxide | 10 parts by weight |
| Stearic acid | 1 part by weight |
| Zinc oxide | 5 parts by weight |
| Dicumyl peroxide | 9 parts by weight |
| Sulfur | 0.3 parts by weight |

In Comparative Example 1, the content of silica was less than 30 by weight per 100 parts by weight of rubber.

In Comparative Example 2, the content of silica exceeded 90 parts by weight per 100 parts by weight of rubber.

In Comparative Example 3, the content of the aminoalcohol was less than 2 parts by weight per 100 parts by weight of rubber.

In Comparative Example 4, the content of the glycol was less than 5 parts by weight per 100 parts by weight of rubber.

In Comparative Example 5, the content of the aminoalcohol exceeded 30 parts by weight per 100 parts by weight of rubber.

In Comparative Example 6, the content of the glycol exceeded 50 parts by weight per 100 parts by weight.

TABLE 1

|  | Example 1 | Example 2 | Example 3 | Example 4 | Example 5 |
|---|---|---|---|---|---|
| Natural rubber | 100 | 100 | 100 | 100 | 100 |
| Styrene-butadiene copolymer rubber |  |  |  |  |  |
| Polybutadiene rubber |  |  |  |  |  |
| Silica | 60 | 60 | 60 | 60 | 60 |
| Activated carbon |  |  |  |  |  |
| Activated alumina |  |  |  |  |  |
| Monoethanolamine | 10 |  |  |  |  |
| Diethanolamine |  | 10 |  |  |  |
| N-Methyl-ethanolamine |  |  | 10 |  |  |
| 2-Amino-2-methylpropanol |  |  |  | 10 |  |
| 3-Aminopropanol |  |  |  |  | 10 |
| 2-Aminopropanol |  |  |  |  |  |
| Ethylene glycol |  |  |  |  |  |
| Diethylene glycol |  |  |  |  |  |
| Triethylene glycol |  |  |  |  |  |
| Propylene glycol |  |  |  |  |  |
| Dipropylene glycol | 20 | 20 | 20 | 20 | 20 |
| H$_2$O |  |  |  |  |  |
| Stearic acid | 1 | 1 | 1 | 1 | 1 |
| Zinc oxide | 3 | 3 | 3 | 3 | 3 |
| N-tert-Butyl-2-benzothiazole sulfenamide | 0.5 | 0.5 | 0.5 | 0.5 | 0.5 |
| Sulfur | 2 | 2 | 2 | 2 | 2 |
| Result |  |  |  |  |  |

TABLE 1-continued

|  | Example 1 | Example 2 | Example 3 | Example 4 | Example 5 |
|---|---|---|---|---|---|
| Metal mold cleaning effect | 9 | 9 | 8 | 9 | 9 |

TABLE 2

|  | Example 6 | Example 7 | Example 8 | Example 9 | Example 10 |
|---|---|---|---|---|---|
| Natural rubber | 100 | 100 | 100 | 100 | 100 |
| styrene-butadiene copolymer rubber |  |  |  |  |  |
| Polybutadiene rubber |  |  |  |  |  |
| Silica | 60 | 60 | 60 | 60 | 60 |
| Activated carbon |  |  |  |  |  |
| Activated alumina |  |  |  |  |  |
| Monoethanolamine |  | 10 | 10 | 3 | 25 |
| Diethanolamine |  |  |  |  |  |
| N-Methyl-ethanolamine |  |  |  |  |  |
| 2-Amino-2-methylpropanol |  |  |  |  |  |
| 3-Aminopropanol |  |  |  |  |  |
| 2-Aminopropanol | 10 |  |  |  |  |
| Ethylene glycol |  | 7 |  |  |  |
| Diethylene glycol |  |  | 46 |  |  |
| Triethylene glycol |  |  |  | 20 |  |
| Propylene glycol |  |  |  |  | 20 |
| Dipropylene glycol | 20 |  |  |  |  |
| H$_2$O |  |  |  |  |  |
| Stearic acid | 1 | 1 | 1 | 1 | 1 |
| Zinc oxide | 3 | 3 | 3 | 3 | 3 |
| N-tert-Butyl-2-benzothiazole sulfenamide | 0.5 | 0.5 | 0.5 | 0.5 | 0.5 |
| Sulfur | 2 | 2 | 2 | 2 | 2 |
| Result |  |  |  |  |  |
| Metal mold cleaning effect | 9 | 8 | 8 | 7 | 8 |

TABLE 3

|  | Example 11 | Example 12 | Example 13 | Example 14 | Example 150 |
|---|---|---|---|---|---|
| Natural rubber | 50 | 50 | 100 | 100 | 100 |
| Styrene-butadiene copolymer rubber | 50 |  |  |  |  |
| Polybutadiene rubber |  | 50 |  |  |  |
| Silica | 85 | 40 | 60 | 50 | 50 |
| Activated carbon |  |  |  | 10 |  |
| Activated alumina |  |  |  |  | 10 |
| Monoethanolamine | 10 | 10 | 5 | 10 | 10 |
| Diethanolamine |  |  |  |  |  |
| N-Methyl-ethanolamine |  |  |  |  |  |
| 2-Amino-2-methylpropanol |  |  | 5 |  |  |
| 3-Aminopropanol |  |  |  |  |  |
| 2-Aminopropanol |  |  |  |  |  |
| Ethylene glycol |  |  |  |  |  |
| Diethylene glycol |  |  |  |  |  |
| Triethylene glycol |  |  |  |  |  |
| Propylene glycol |  |  |  |  |  |
| Dipropylene glycol | 20 | 20 | 15 | 15 | 15 |
| H$_2$O |  |  |  |  |  |
| Stearic acid | 1 | 1 | 1 | 1 | 1 |
| Zinc oxide | 3 | 3 | 3 | 3 | 3 |
| N-tert-Butyl-2-benzothiazole sulfenamide | 0.5 | 0.5 | 0.5 | 0.5 | 0.5 |
| Sulfur | 2 | 2 | 2 | 2 | 2 |
| Result |  |  |  |  |  |
| Metal mold cleaning effect | 7 | 8 | 8 | 8 | 7 |

TABLE 4

|  | Comparative Example 1 | Comparative Example 2 | Comparative Example 3 | Comparative Example 4 | Example 16 | Example 17 |
|---|---|---|---|---|---|---|
| Natural rubber | 100 | 100 | 100 | 100 | 100 | 100 |
| Styrene-butadiene copolymer rubber |  |  |  |  |  |  |
| Polybutadiene rubber |  |  |  |  |  |  |
| Silica | 25 | 95 | 60 | 60 | 60 | 35 |
| Activated carbon |  |  |  |  |  |  |
| Activated alumina |  |  |  |  |  |  |
| Monoethanolamine | 10 | 10 | 1 | 10 | 10 | 10 |
| Diethanolamine |  |  |  |  |  |  |
| N-Methyl-ethanolamine |  |  |  |  |  |  |
| 2-Amino-2-methylpropanol |  |  |  |  |  |  |

TABLE 4-continued

|  | Comparative Example 1 | Comparative Example 2 | Comparative Example 3 | Comparative Example 4 | Example 16 | Example 17 |
| --- | --- | --- | --- | --- | --- | --- |
| 3-Aminopropanol |  |  |  |  |  |  |
| 2-Aminopropanol |  |  |  |  |  |  |
| Ethylene glycol |  |  |  |  |  |  |
| Diethylene glycol |  |  |  |  |  |  |
| Triethylene glycol |  |  |  |  |  |  |
| Propylene glycol |  |  |  |  |  |  |
| Dipropylene glycol | 20 | 20 | 20 | 3 | 20 | 20 |
| H$_2$O |  |  |  |  | 10 |  |
| Stearic acid | 1 | 1 | 1 | 1 | 1 | 1 |
| Zinc oxide | 3 | 3 | 3 | 3 | 3 | 3 |
| N-tert-Butyl-2-benzothiazole sulfenamide | 0.5 | 0.5 | 0.5 | 0.5 | 0.5 | 0.5 |
| Sulfur | 2 | 2 | 2 | 2 | 2 | 2 |
| Result |  |  |  |  |  |  |
| Metal mold cleaning effect | 5 | 5 | 4 | 5 | 10 | 8 |

TABLE 5

|  | Comparative Example 5 | Comparative Example 6 | Prior Art Example |
| --- | --- | --- | --- |
| Natural rubber | 100 | 100 |  |
| Styrene-butadiene copolymer rubber |  |  |  |
| Polybutadiene rubber |  |  |  |
| Silica | 60 | 60 |  |
| Activated carbon |  |  |  |
| Activated alumina |  |  |  |
| Monoethanolamine | 35 | 10 |  |
| Diethanolamine |  |  |  |
| N-Methyl-ethanolamine |  |  |  |
| 2-Amino-2-methylpropanol |  |  |  |
| 3-Aminopropanol |  |  |  |
| 2-Aminopropanol |  |  |  |
| Ethylene glycol |  |  |  |
| Diethylene glycol |  |  |  |
| Triethylene glycol |  |  |  |
| Propylene glycol |  |  |  |
| Dipropylene glycol | 20 | 55 |  |
| H$_2$O | 10 |  |  |
| Stearic acid | 1 | 1 |  |
| Zinc oxide | 3 | 3 |  |
| N-tert-Butyl-2-benzothiazole sulfenamide | 0.5 | 0.5 |  |
| Sulfur | 2 | 2 |  |
| Result |  |  |  |
| Metal mold cleaning effect | 7 | 6 | 4 |

EXAMPLES 18–24, COMPARATIVE EXAMPLES 7–9

Rubber compositions having the formulas as shown in Table 6 were kneaded and evaluated for the flowability of rubber after heated at 170° C. for 10 min. at a pressure of 40 psi. by measuring the length of flowing of the rubber by means of GARLOCK Flow Index Tester.

Then, each of the rubber compositions was formed into a non-vulcanized rubber sheet of 2 mm thick. Among them, 5 kinds of rubber sheets, that is, those of Examples 18–21 and Comparative Example 7, were adhered to the 5 equally divided surface areas of a green tire of 135 SR 12 in tire size, respectively, to cover the whole surface.

The other 5 kinds of rubber sheets were also adhered to the 5 equally divided surface areas of a green tire of the same size as above, respectively to cover the whole surface.

These green tires were placed in metal molds, respectively, in each of which a green tire of the same size as above had been continuously vulcanized for two weeks resulting in that the surface of the metal mold was made dirty to become black. These green tires were vulcanized for 15 min. and then taken out of the metal mold according to an ordinary procedure.

In order to evaluate the degree of cleaning at the bent hole portion of the tread of the tire, 50 samples of bent pieces were collected at random from each. The dirt attached to the surface was scratched off with a knife and weighed.

The case of the largest weight was marked as degree of cleaning of 10, and the others were marked by the weight as an index based on 10 as above. Therefore, the larger the numerical value, the better the cleaning.

The results are shown in table 6.

TABLE 6

|  | Example | | | | | | | Comparative Example | | |
| --- | --- | --- | --- | --- | --- | --- | --- | --- | --- | --- |
|  | 18 | 19 | 20 | 21 | 22 | 23 | 24 | 7 | 8 | 9 |
| Natural rubber | 100 | 100 | 100 | 100 | 100 | 100 | 100 | 100 | 100 | 100 |
| Silica | 60 | 60 | 60 | 60 | 60 | 60 | 60 | 60 | 60 | 60 |

TABLE 6-continued

|  | Example | | | | | | | Comparative Example | | |
|---|---|---|---|---|---|---|---|---|---|---|
|  | 18 | 19 | 20 | 21 | 22 | 23 | 24 | 7 | 8 | 9 |
| Monoethanolamine | 10 | 10 | 10 | 10 | 10 | — | — | 10 | 10 | — |
| N-Methylethanolamine | — | — | — | — | — | 10 | 10 | — | — | 10 |
| Dipropylene glycol | 20 | 20 | 20 | 20 | 20 | — | — | 20 | 20 | — |
| Diethylene glycol | — | — | — | — | — | 20 | 20 | — | — | 20 |
| Bis(3-triethoxysilylpropyl) tetrasulfane* | 0.5 | 1 | 3 | 6 | 10 | 1 | 3 | — | 12 | — |
| Stearic acid | 1 | 1 | 1 | 1 | 1 | 1 | 1 | — | 12 | — |
| Zinc oxide | 3 | 3 | 3 | 3 | 3 | 3 | 3 | 3 | 3 | 3 |
| N-tert-butyl-2-benzothiazole sulfenamide | 0.5 | 0.5 | 0.5 | 0.5 | 0.5 | 0.5 | 0.5 | 0.5 | 0.5 | 0.5 |
| Sulfur | 2 | 2 | 2 | 2 | 2 | 2 | 2 | 2 | 2 | 2 |
| Result Flowability of rubber(mm) | 10 | 20 | 25 | 28 | 31 | 11 | 24 | 0 | 32 | 0 |
| Metal mold cleaning effect | 6 | 8 | 10 | 10 | 9 | 7 | 9 | 2 | 8 | 1 |

*Si 69 (trade name, manufactured by Degussa)

As is clear from Table 6, the rubber compositions of the present invention as shown in Examples exhibited a very good cleaning effect since the cleaning rubber flowed into even minute portions of the metal molds.

In Comparative Example 8 where 12 parts by weight (exceeding 10 parts by weight) of the organic silane was used, the flowability of rubber was somewhat large, but the effect of cleaning metal mold was lower than that when 3 parts by weight of the organic silane was used (Examples 20 and 24), and therefore, it is not preferable from an economical point of view.

EXAMPLES 25–30, COMPARATIVE EXAMPLES 10–11

Each of various rubber compositions having the formulas as shown in Table 7 was kneaded and the cross-linking speed at 175° C. was measured by using a curastmeter.

The rubber composition thus kneaded was formed into a non-vulcanized rubber sheet of 2 mm thick.

The rubber sheets prepared from the rubber compositions of Examples 25–27 and Comparative Example 10 were adhered to the 4 equally divided surface of a green tire of 135 SR 12 in tire size, respectively.

The other rubber sheets were also adhered to the 4 equally divided surface of a green tire of the same size as above.

The respective green tires thus processed were inserted in the respective metal molds in each of which a green tire of the same size as above had been continuously vulcanized for two weeks resulting in that the surface of the metal mold was made dirty to become black. These green tires were vulcanized at a temperature of a platen of 165° C. for 15 min. and then taken out of the metal mold according to an ordinary procedure.

The degree of metal mold cleaning was evaluated by eye observation. The degree was classified into ten grades, that is, mark 1 to mark 10 where "1" stands for "not cleaned at all" while "10" stands for "cleaned completely". The results are shown in Table 7.

In order to evaluate the amount of the cleaning rubber flowing into the bent hole part of the tread portion of the tire thus taken out, 10 samples of spue were collected at random from each tread portion and the length of each spue was measured. The results are shown in Table 7.

TABLE 7

|  | Example | | | | | | Comparative Example | |
|---|---|---|---|---|---|---|---|---|
|  | 25 | 26 | 27 | 28 | 29 | 30 | 10 | 11 |
| Natural rubber | 100 | 100 | 100 | 100 | 100 | 100 | 100 | 100 |
| Silica | 60 | 60 | 60 | 60 | 60 | 60 | 60 | 60 |
| Monoethanolamine | 10 | 10 | 10 | 10 | — | — | 10 | — |
| N-Methylethanolamine | — | — | — | — | 10 | 10 | — | 10 |
| Dipropylene glycol | 15 | 15 | 15 | 15 | — | — | 15 | — |
| Diethylene glycol | — | — | — | — | 20 | 20 | — | 15 |
| Stearic acid | 1 | 1 | 1 | 1 | 1 | 1 | 1 | 1 |
| Zinc oxide | 3 | 3 | 3 | 3 | 3 | 3 | 3 | 3 |
| Accelerator NS*1 | — | — | — | — | — | — | 0.5 | 0.5 |
| Sulfur | — | — | — | — | — | — | 2 | 2 |
| Perhexa V*2 | 2 | — | — | — | 2 | — | — | — |
| Percumyl D*3 | — | 1 | — | — | — | — | — | — |
| Perhexa 25 B*4 | — | — | 3.5 | — | — | — | — | — |
| Perhexyne 25 B*5 | — | — | — | 2.5 | — | 4.5 | — | — |
| Result Curast T 90 (170° C.) (Index) | 160 | 370 | 580 | 1250 | 170 | 1210 | 100 | 100 |
| Length of spue | 5–6 | 7–8 | 9–10 | 12–14 | 7–8 | 9–10 | 2–3 | 2–3 |
| Effect of cleaning metal mold | 10 | 10 | 10 | 10 | 10 | 10 | 8 | 7 |

(Note)
*1 Manufactured by Ohuchi Shinkoh
*2 n-Butyl-4,4-bis(t-butylperoxy)valerate, manufactured by Nihon Yushi K.K. (one minute half-life temperature, 166° C.)
*3 Dicumyl peroxide, manufactured by Nihon Yushi K.K. (one minute half-life temperature, 171° C.)
*4 2,5-Dimethyl-2,5-di(t-butylperoxy)hexane, manufactured by Nihon Yushi K.K. (one minute half-life temperature, 179° C.)
*5 2,5-Dimethyl-2,5-(t-butylperoxy)hexyne-3, manufactured by Nihon Yushi K.K. (one minute half-life temperature, 193° C.)

What is claimed is:

1. A method for cleaning a metal mold for rubber dirtied by repeating vulcanization of non-vulcanized rubber articles which comprises:

inserting into the metal mold a cleaning rubber article composed of the non-vulcanized rubber article having a sheet attached to the surface facing the metal mold, the sheet being composed of a cleaning rubber composition comprising 100 parts by weight of a rubber selected from the group consisting of natural rubber, synthetic rubber and a blend thereof, 2–30 parts by weight of an aminoalcohol, 5–50 parts by weight of a glycol and 30–90 parts by weight of an adsorptive;

heating the cleaning rubber article to adsorb the dirt to the cleaning rubber article; and then taking the cleaning rubber article out of the metal mold resulting in the removal of the dirt from the surface of the metal mold.

2. The method for cleaning a metal mold for rubber according to claim 1 in which the aminoalcohol is at least one member selected from the group consisting of monoethanolamine, diethanolamine, triethanolamine, N-methylethanolamine, N,N-dimethylethanolamine, N,N-dibutylethanolamine, N,N-diethylethanolamine, N-methyl-N,N-diethanolamine, 2-amino-2-methyl-propanol, 3-aminopropanol, and 2-aminopropanol.

3. The method for cleaning a metal mold for rubber according to claim 1 in which the glycol is at least one member selected from the group consisting of ethylene glycol, diethylene glycol, triethylene glycol, propylene glycol, and dipropylene glycol.

4. The method for cleaning a metal mold for rubber according to claim 1 in which the aminoalcohol is at least one member selected from the group consisting of monoethanolamine, diethanolamine, 2-amino-2-methyl-propanol, 3-aminopropanol, and 2-aminopropanol.

5. The method for cleaning a metal mold for rubber according to claim 1 in which the glycol is diethylene glycol and/or dipropylene glycol.

6. The method for cleaning a metal, mold for rubber according to claim 1 in which the amount of the aminoalcohol is 5–20 parts by weight based on 100 parts by weight of the rubber.

7. The method for cleaning a metal mold for rubber according to claim 1 in which the amount of the glycol is 10–30 parts by weight based on 100 parts by weight of the rubber.

8. The method for cleaning a metal mold for rubber according to claim 1 in which the adsorptive is at least one member selected from the group consisting of silica, activated alumina, activated carbon, magnesium oxide, titanium oxide, magnesium carbonate, calcium carbonate, bentonite, and diatomaceous earth.

9. The method for cleaning a metal mold for rubber according to claim 1 in which the adsorptive is silica.

10. The method for cleaning a metal mold for rubber according to claim 1 in which the amount of the adsorptive is 40–70 parts by weight based on 100 parts by weight of the rubber.

11. The method for cleaning a metal mold for rubber according to claim 1 in which water is contained in an amount of 2–20 parts by weight based on 100 parts by weight of the rubber.

12. A method for cleaning a metal mold for rubber dirtied by repeating vulcanization of non-vulcanized rubber articles which comprises:

inserting into the metal mold a cleaning rubber article composed of the non-vulcanized rubber article having a sheet attached to the surface facing the metal mold, the sheet being composed of a cleaning rubber composition comprising 100 parts by weight of a rubber selected from the group consisting of natural rubber, synthetic rubber and a blend thereof, 2–30 parts by weight of an aminoalcohol, 5–50 parts by weight of a glycol, 30–90 parts by weight of an adsorptive, and 0.1–10 parts by weight of an organic silane of the general formula,

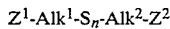

$$Z^1\text{-Alk}^1\text{-}S_n\text{-Alk}^2\text{-}Z^2$$

where $Z^1$ and $Z^2$ are independently

in which $R^1$, $R^2$ and $R^3$ are similar or dissimilar and alkoxy groups having 1–4 carbon atoms, $Alk^1$ and $Alk^2$ are similar or dissimilar and divalent hydrocarbon radicals having 1–6 carbon atoms and n is a number of 2–6;

heating the cleaning rubber article to adsorb the dirt to the cleaning rubber article; and then taking the cleaning rubber article out of the metal mold resulting in the removal of the dirt from the surface of the metal mold.

13. The method for cleaning a metal mold for rubber according to claim 12 in which the cleaning rubber composition contains water in an amount of 2–20 parts by weight based on 100 parts by weight of the rubber.

14. The method for cleaning a metal mold for rubber according to claim 12 in which the organic silane is bis (3-triethoxysilylpropyl)-tetrasulfane.

15. A method for cleaning a metal mold for rubber made dirty by repeating vulcanization of non-vulcanized rubber articles which comprises:

inserting into the metal mold a cleaning rubber article composed of cleaning the non-vulcanized rubber article having a sheet attached to the surface facing the metal mold, the sheet being composed of the rubber composition which comprises 100 parts by weight of a rubber selected from the group consisting of natural rubber, synthetic rubber and a blend thereof, 2–30 parts by weight of an aminoalcohol, 5–50 parts by weight of a glycol, 30–90 parts by weight of an adsorptive, and 0.5–50 parts by weight of an organic peroxide having a half-life due to decomposition of at least one minute at a heating temperature at which the rubber composition is used, heating the cleaning rubber article to adsorb the dirt to the cleaning rubber article; and then taking the cleaning rubber article out of the metal mold resulting in the removal of the dirt from the surface of the metal mold.

16. The method for cleaning a metal mold for rubber according to claim 15 in which the organic peroxide is at least one member selected from the group consisting of 1,1-bis (t-butylperoxy)-3,3,5-trimehtylcyclohexane, 1,1-bis(t-butylperoxy)cyclohexane, t-butylperoxymaleic acid, t-butyl peroxyoleate, t-butyl peroxy-3,3,5-trimethylhexanoate, cyclohexanone peroxide, t-butyl peroxyarylcarbonate, t-butyl peroxyisopropylcarbonate, 2,5-dimethyl-2,5-di(benzoylperoxy)hexane, 2,2-bis(t-butylperoxy)octane, t-butyl peroxyacetate, 2,2-bis(t-butylperoxy)butane, t-butyl peroxybenzoate, n-butyl-4,4- bis(t-butylperoxy)valerate, di-t-butyl peroxyisophthalate, methyl ethyl ketone peroxide, di-cumyl peroxide, 2, 5-dimethyl-2,5-di(t-butylperoxy)hexane, α,α'-bis(t-butyl-peroxy-m-isopropyl)benzene, t-butylcumylperoxide, di-isopropylbenzene hydroperoxide, di-t-butylperoxide, and 2, 5-dimethyl-2,5-di(t-butylperoxy)hexyne-3.

* * * * *